United States Patent [19]

Galant

[11] Patent Number: 4,569,282

[45] Date of Patent: Feb. 11, 1986

[54] PLUNGER HAY BALER

[75] Inventor: Jean-Claude Galant, Saint Jean de Braye, France

[73] Assignee: Regie Nationale des Usines Renault, Boulogne-Billancourt, France

[21] Appl. No.: 587,113

[22] Filed: Mar. 7, 1984

[30] Foreign Application Priority Data

Mar. 22, 1983 [FR] France .................. 83 04635

[51] Int. Cl.[4] .................. B30B 1/26; A01D 39/00
[52] U.S. Cl. .................. 100/189; 56/341
[58] Field of Search ............ 100/100, 179, 188 R, 100/189, 245, 295; 56/341, 342, 343, 344

[56] References Cited

U.S. PATENT DOCUMENTS

| 3,552,109 | 8/1968 | Murray et al. | 100/100 X |
| 4,034,543 | 7/1977 | Voth et al. | 100/189 X |
| 4,118,918 | 10/1978 | White | 100/189 X |
| 4,413,555 | 11/1983 | Swinney | 100/295 |

Primary Examiner—Peter Feldman
Attorney, Agent, or Firm—Oblon, Fisher, Spivak, McClelland & Maier

[57] ABSTRACT

Plunger type hay baler having a frame 1 forming an internal pressing channel 5 in which a pressing plunger 9 moves in a reciprocating movement, an intake orifice 6 through which hay loads into the pressing channel 5 and a loading chute 7 which connects to the pressing channel 5 at the orifice 6. A loader 35 which operates in synchronization with the alternating movement of the plunger 9, periodically introduces into the loading channel 7 basic loads and causes them to go from the loading chute 7 into the pressing channel 5. The loader 35 and pressing plunger 9 are respectively associated with a transmission system 32, 22, 25, 24, 27, 28, 30 for transforming a continuously circular movement of a driving crankshaft 12 of the pressing plunger 9 into an alternating circular movement of the driving pivot 28 of the loader 35.

8 Claims, 7 Drawing Figures

PLUNGER HAY BALER

BACKGROUND OF THE INVENTION

The invention relates to a plunger type hay baler whose frame can be hitched to a tractor to assure intake and packing of the hay in a pressing channel of the machine during advance of the baler.

Such a baler is known from Patent FR 2 346,963 in which a loading chute connects to the pressing channel while a plunger with alternating movement assures packing of the hay load conveyed by the loading chute. In this baler, the phase of packing the hay load is an important phase of preparing a bale having a desired density and shape. In view of the varieties of hay and the varied shapes of rows, the baler plunger packs successive hay loads whose volume and density are constant. Feeding of the pressing channel under these conditions requires the use of a density measuring system.

SUMMARY OF THE INVENTION

One of the objects of the invention, therefore, is to introduce loads of varied densities and sizes into the pressing channel and to use a single alternating movement intake device which introduces the load into the pressing channel and whose travel is modifiable and synchronized with that of the pressing plunger, thus making possible a compact bale exhibiting approximately a uniform density.

To achieve this result, an important characteristic of the invention consists of accumulating basic loads in the loading chute by a loading device operating in synchronization with the alternating movement of the plunger to make the loads go successively from the loading chute into the pressing channel. An oscillating movement can be imparted to the front face of the plunger between the forward and back end positions of the plunger.

Another characteristic of the invention consists of a device for precompression of the hay in the loading chute before making it go into the pressing channel, by reducing the section of the loading chute, in the vicinity of the load intake orifice to the pressing channel.

Among the other characteristics of the baler, there will be described in particular the displacement movement of the pressing plunger whose kinetics accelerate the opening and closing of the intake orifice and assure a better filling of the pressing channel.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
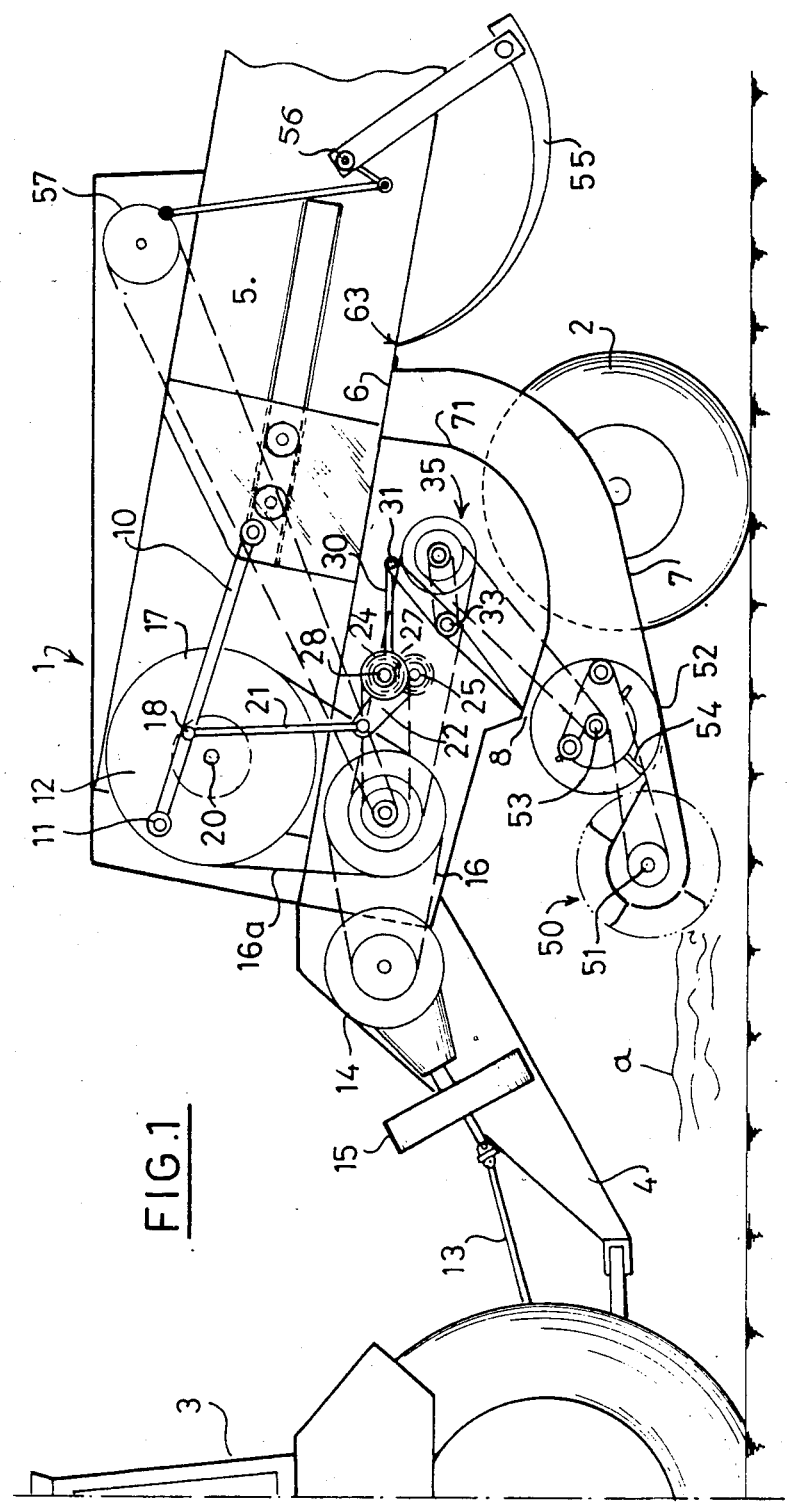
FIG. 1 is a schematic illustration of the baler operated according to the above mentioned operating principle.

The plunger baler shown in FIG. 1 includes a frame 1 supported on the ground by wheels 2 and hitched to a tractor 3 by a drawbar 4. The interior of frame 1 defines a pressing channel 5 which connects to a loading chute 7 at an intake orifice 6. Loading chute 7, which is curved upward from front to back, is suspended on the frame 1. The lower input end 8 of the loading chute, which is relatively far from orifice 6, is much more flared than the upper end which is in contact with intake orifice 6, thus forming a hay feed compartment. Upper wall 71 of chute 7 is provided with laterally spaced, longitudinal slits over its entire length, while its lower part, which is also curved, is solid.

Figure 7:
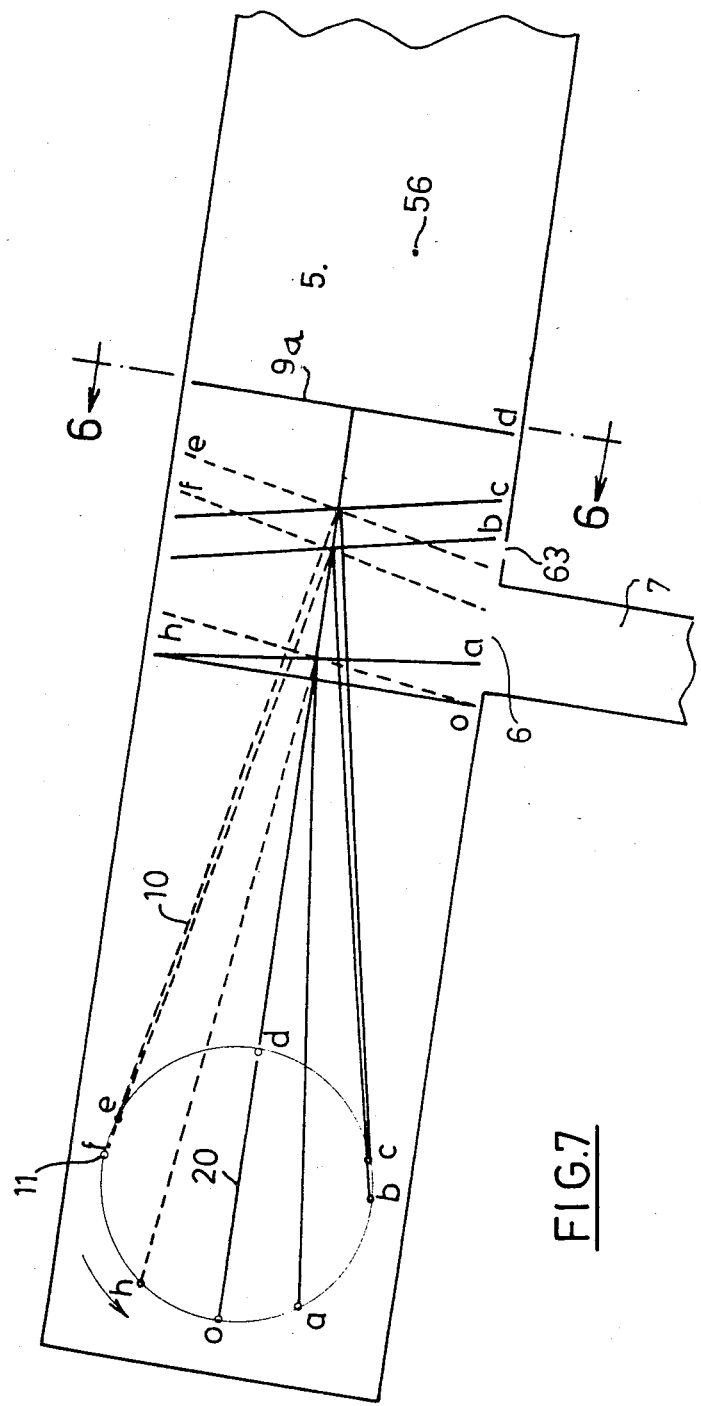
FIG. 7 is a schematic illustration of the displacements of the piston between the front and back dead centers in the example of direct mounting of the plunger on the crankshaft.

A pressing plunger 9 is movable along the length of pressing channel 5 and reciprocates between a back dead center (BDC) and a front dead center (FDC), respectively, shown in FIG. 7. For this purpose, the back part of plunger 9 may be rigidly connected by a coupling rod or tail 10 to crankpin 11 of a crankshaft 12. The connection is such as to position the front face of the plunger in successive oblique positions during its displacement, while retaining the plunger face perpendicular to the displacement direction at the two dead center positions. However, it should be noted that it is also possible to attach the back part of the plunger to a standard connecting rod to give the plunger a simple straight reciprocating movement. This straight movement is shown in FIG. 1.

The continuous circular movement of crankshaft 12 is driven from the power takeoff by a drive shaft 13 and a bevel pinion transmission gear housing 14 having an inertia flywheel 15 at its input end. The transmission gear housing carries an output element such as a pulley with which a transmission is associated and which here uses a set of chains 16, 16a for driving crankshaft 12.

Coupling tail 10 or, if applicable, the connecting rod, are attached to a rotating plate 17 of the crankshaft 12. The plate 17 carries two crankpins 11, 18 radially unequally spaced from the rotational shaft 20 of the plate 17. Crankpin 11 is attached to the plate 17 for driving rod 10 while crankpin 18 attached to plate 17 connects to a transmission connecting rod 21 attached to a rocker lever 22. Rocker lever 22 is mounted for movement around a fixed shaft 23 fastened to frame 1 and carries a transmission unit made up of two meshed pinions 24 and 25. Pinion 24 is mounted on shaft 23 while pinion 25 is mounted on rotating shaft 26 fastened to rocker lever 22. To pinion 25 is fastened a crankpin 27 carrying a pivot 28 which thus moves in synchronization with the back and forth movement of pressing plunger 9.

Crankpin 27 drives, by pivot 28, an arm 30 mounted to pivot around a shaft 31 on which are mounted a multiplicity of teeth 32 of loader 35. Teeth 32 are suspended on a laterally extending pipe 33 which hangs over loading chute 7. Pipe 33 is fastened to a driving crankpin or arm 34 which turns around a shaft 36, which is optionally adjustable and is fastened to frame 1. The shaft 36 is driven by the power takeoff 13, as shown in FIG. 1. The rotation of crankpin 34 also moves rotation shaft 33 of teeth 32, and movement of pivot 28 modifies path A at the end of teeth 32 during movement of crankpins 27 and 34. However, it should be noted that a similar result can be obtained by a rotation of pivot 28 and reciprocation of shaft 36.

Figure 2:
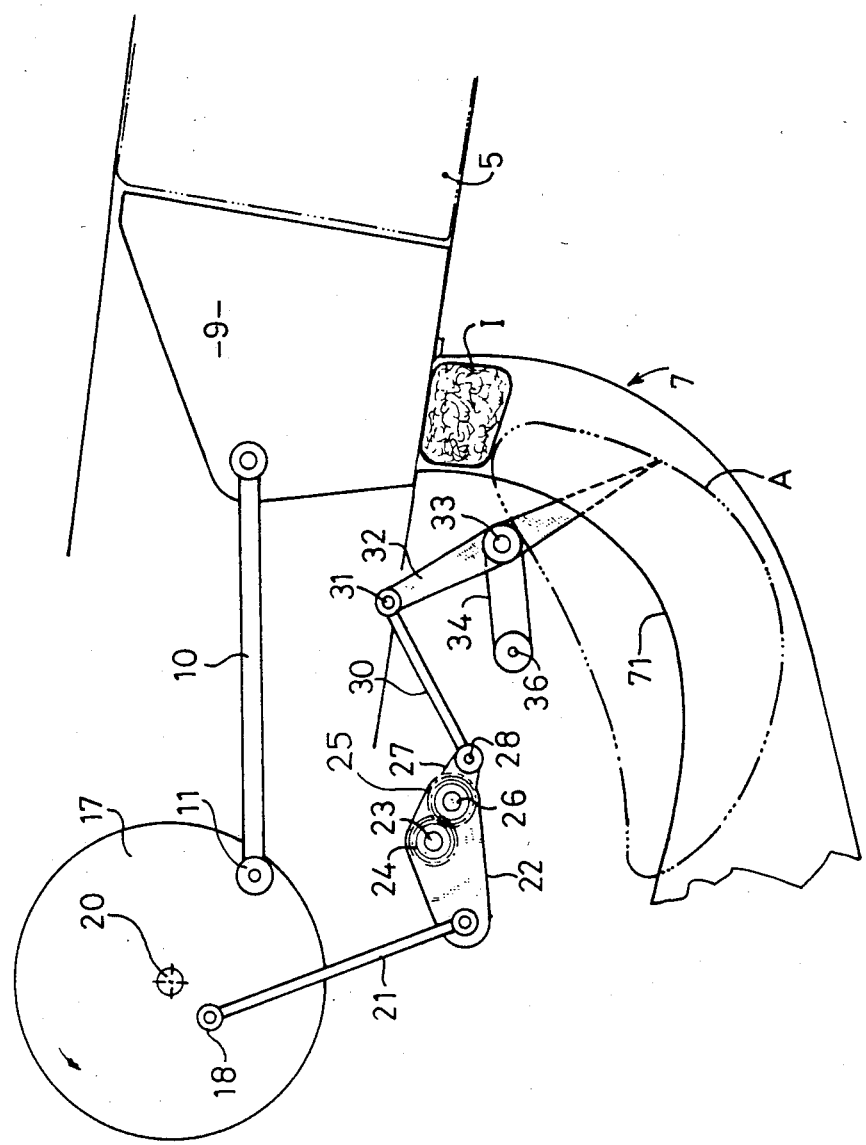
FIG. 2 is a partial vertical section of the loader and transmission system providing synchronization of the respective movements of the plunger and loader during precompression of a first hay load.
Figure 3:
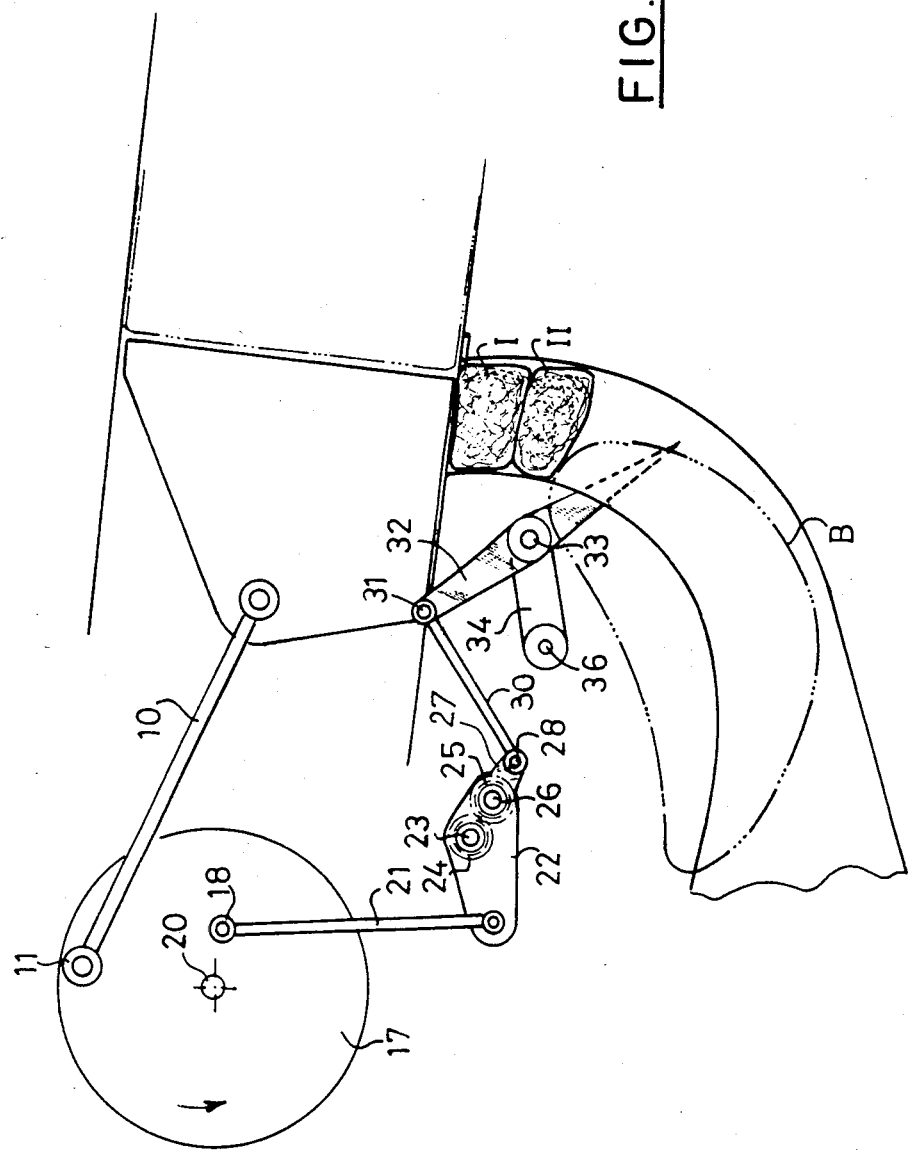
FIG. 3 is a view similar to that of FIG. 2 during precompression of a second hay load.

The group of teeth 32 thus constitute a loading fork engaged in the corresponding passage slits of wall 71 of loading chute 7 and assures shaping and accumulation of basic hay loads I, II as shown in FIGS. 2 and 3.

Figure 5:
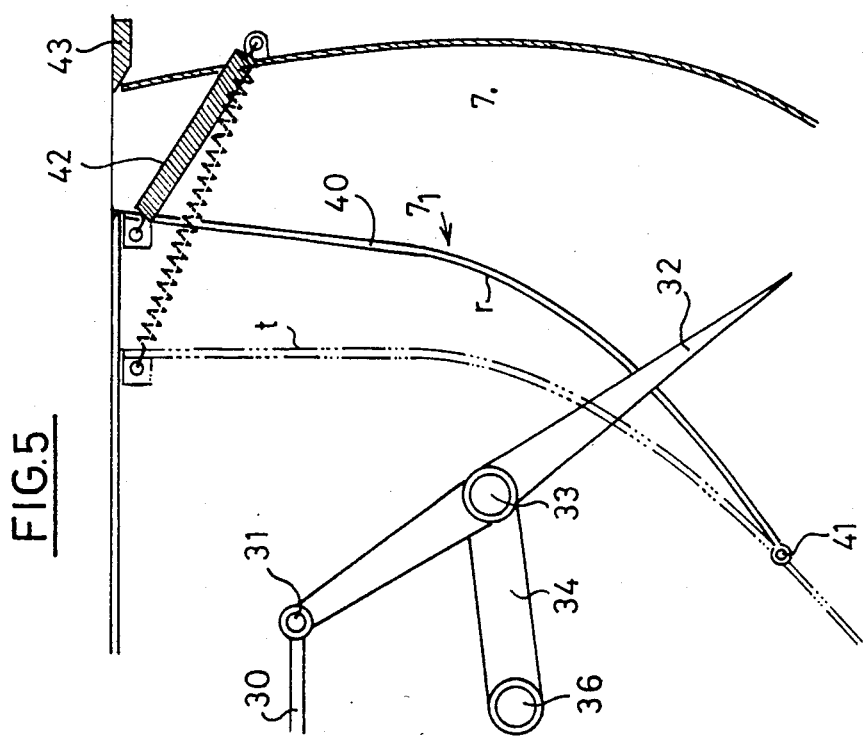
FIG. 5 is a section of the upper part of the loading chute.

Loading fork 32 is thus intended periodically to shove into pressing channel 5 a group of basic loads, I, II, III previously accumulated in the upper part of chute 7. With reference to FIG. 5, it can be seen that the longitudinal slits of wall 71 separate, between them, a succession of strips 40 constituting the upper end of wall 71 respectively hinged around the same shaft 41 and able to move from rest position r to working position t against the opposing force exerted by lateral springs 42. However, it should be noted that the movement of the strips could also be provided by a connecting rod assembly whose movement would be linked to the position of pressing plunger 9 in the pressing channel. The section of the upper part of loading chute 7 can be modified to achieve a precompression and rolling in the chute 7 of successive hay loads before their introduction into pressing channel 5. This manner of operating makes the delivery to intake orifice 6 uniform and assures that material is fed from the pressing channel into contact with the entire front face of plunger 9.

To facilitate separation of the loads already contained in pressing channel 5 and the loads being shaped in loading chute 7, the lower face of channel 5 carries a knife 43 whose length of cut corresponds to the size of intake orifice 6 and which cuts the load introduced into the pressing channel at each forward displacement of plunger 9.

The hay feed compartment located at the lower input end 8 of loading chute 7 is located in the vicinity of a collecting unit 50. This unit, mounted to rotate around a shaft 51, can have a toothed structure able to collect the hay placed in rows "a" on the ground as the baler advances. The hay lifted by the teeth of the collecting unit 50 is driven into an Archimedean screw conveyor 52 which reduces the width of row "a" to the width of the loading chute. The screw conveyor 52 turning around shaft 53 in the opposite direction of that of unit 50 can be provided with retractable teeth 54.

The baler further includes a tying mechanism shown schematically by a group of needles 55 whose movement is synchronized with that of knotters 57. Obviously, this mechanism is peripheral to the operating principle of the baler, and any other suitable tying mechanism could be used.

Figure 4:
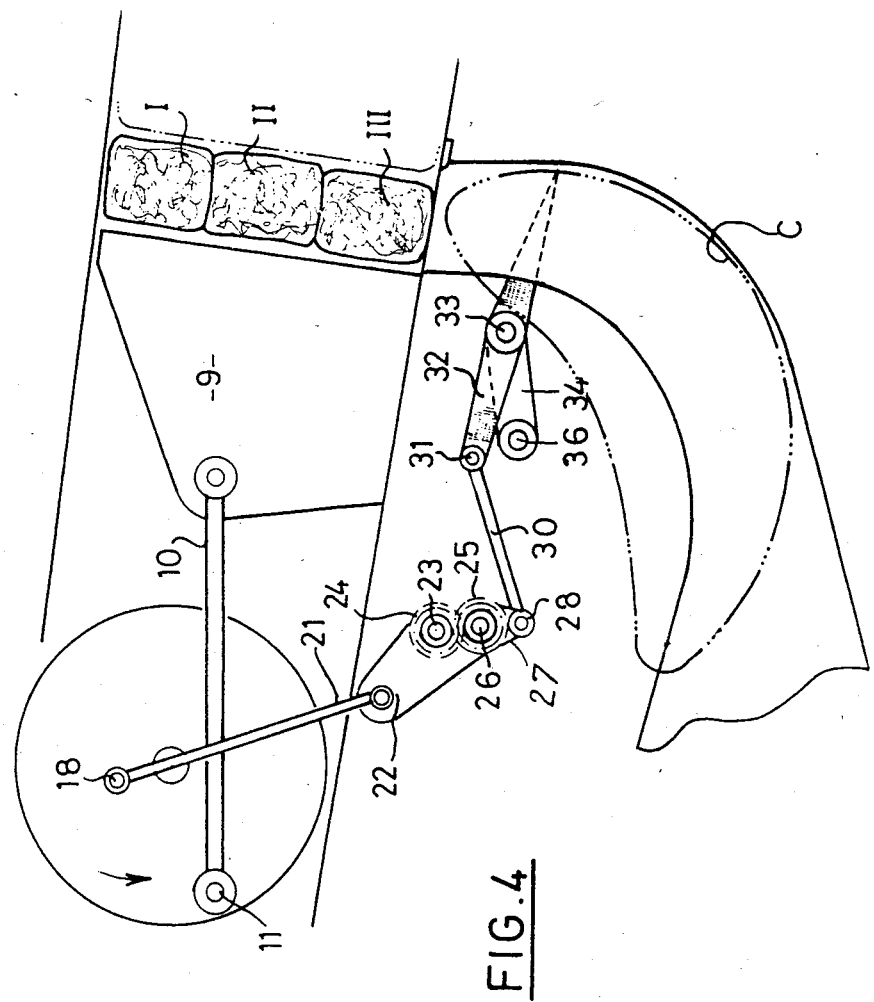
FIG. 4 is a view similar to that of FIG. 2 showing the introduction of successive loads in the pressing channel during the baling cycle.

The baler operates as follows:

During advance of the baler, collecting unit 50 lifts rows "a" and makes them move backward in contact with conveyor 52 and into loading chute 7. Teeth 32 of loader 35 mounted to reciprocate around common shaft 33 are driven by driving crankpin 34 and describe a bean-shaped curve A governed by the relative position of shaft 36 and pivot 28. The shape of curve A therefore can be modified either by displacement of pivot 28 or by displacement of shaft 36. In the example shown by FIGS. 2, 3 and 4, pivot 28 is displaced, so that during a complete reciprocation of pressing plunger 9, teeth 32 of the loader describe three different curves A, B, C. In this case, presetting of the drives for various crankpins 11, 18, 34 causes the rotation speed of crankpin 34 around shaft 36 to be three times greater than that of crankpin 11 around shaft 20 of crank 12.

The displacement of pivot 28 can be a slave to a hydraulic or electronic control. For this reason, the description uses the general term transmission which links the synchronous displacements of plunger 9 and loader 35.

Pivot 28 is mounted on a crankpin 27 mounted on rotatable shaft 26. The positions of pivot 28 and shaft 26 can be merged as shown in FIG. 1, or staggered on either side of transmission connecting rod 21.

During the first rotation of loader 35 (FIG. 2) pressing plunger 9 is displaced toward the front dead center position and its lower face closes intake orifice 6. Transmission connecting rod 21 then modifies the orientation of rocker lever 22 on its shaft 23. The resulting angular displacement of shaft 26 of pinion 25 around shaft 23, and the meshing of pinions 24 and 25, transmits movement to pivot 28, which is fixed to pinion 25 via crankpin 27.

The ends of teeth 32 of loader 35 then describe curve A and carry basic load I picked up at the output of screw conveyor 52 to the upper part of loading chute 7. A precompression of the load is thus made jointly by the action of the loader teeth and hinged strips 40 constituting the upper part of wall 71 of the loading chute.

During the second rotation of loader 35 (FIG. 3), pressing plunger 9 starts its backward movement but its lower face still covers intake orifice 6. Rocker lever 22 and pivot 28 are displaced as described with reference to FIG. 2 by the transmission system described above. The ends of teeth 32 of loader 35 then describe curve B and carry a new basic load II picked up at the output of screw conveyor 5 which is now jointly precompressed with first load I.

During the third rotation of loader 35 (FIG. 4), pressing plunger 9 continues its backward movement and its lower face uncovers intake orifice 6. Rocker lever 22 and pivot 28 are again displaced under the action of the transmission system.

The ends of teeth 32 of the loader then describe curve C and carry a new basic load III behind preceding loads I, II. The three loads are introduced into pressing channel 5 by teeth 32.

The three curves A, B and C are the result of the displacements of pivot 28 around shaft 26 of pinion 25 and this same shaft describes a circular path around rotation shaft 23 of rocker lever 22.

It should be noted that shaft 26 which supports crankpin 27 carrying pivot 28, turns jointly with crankpin 34 carrying rotation shaft 33 of teeth 32 of the loader. The path of pivot 28 can also be modified as a result of an adjustment of the height of installation of shafts 23, 26 and 36.

In the example, the teeth of loader 35 describe three different curves whose shape is governed by the design of the kinetic elements of the transmission that links the pressing plunger to the loader. However, it is obvious that neither the number of curves, such as A, B and C, nor their shape should be limited by the example of the baler described and that it would suffice, for example, to modify the rotation speed ratios of crankpins 11 and 34 and the adjustment position of the transmission elements to increase their number and modify the shape of these curves.

In the baler according to FIGS. 1 to 5, pressing plunger 9 is guided laterally in pressing channel 5 by rollers to obtain a displacement of the plunger during whose travel its front face remains parallel to the direction of travel.

When the shaped bale reaches the required size, needles 55, hinged around a shaft 56, are introduced in pressing channel 5 through slits 63 near the front face of the plunger. According to a known mode of design, the front face of the plunger carries passages for various needles of this purpose.

Figure 6:
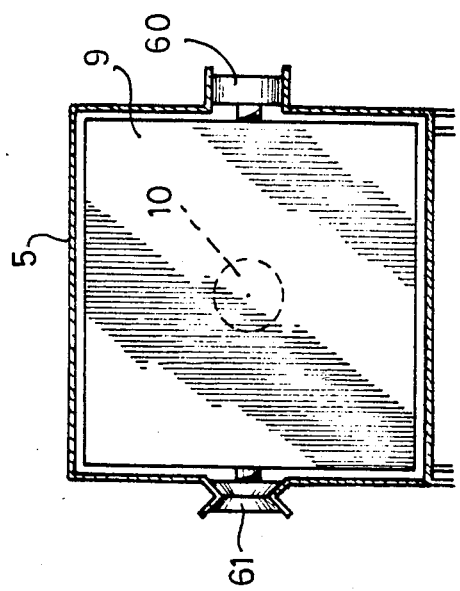
FIG. 6 illustrates a section of a pressing plunger guided in the pressing channel by a set of rollers in plane 6—6 of FIG. 7.

In order to assure a better filling of pressing channel 5, and a fast opening and closing of intake orifice 6, it is possible to add a simplified guide to pressing plunger 9. For this purpose, the back face of the plunger is fixed to a rigid rod or tail 10 coupled with crankpin 11 of crankshaft 12. The lateral guide of each plunger face is limited to a single set of elements 60 and 61 to allow oscillations of the plunger around a horizontal axis passing respectively through a guide roller 61 and a support roller 60 which constitutes the plunger guide in association with adjustable roller tracks provided on the opposite lateral faces of pressing channel 5 and with the housings of elements 60 and 61 (FIG. 6).

Front face 9a of the pressing plunger occupies, according to FIG. 7, during rotation of crankpin 11, successive oblique positions in relation to the bottom of pressing channel 5 and positions perpendicular to said bottom when the plunger occupies the front dead center and back dead center positions.

The additional advantages obtained by the simplified mode of guiding plunger 9 resides in the fact that the obliqueness of the front face during the compression phase considerably reduces the stresses on crankpin 11. It should also be noted that the inclination of the front face of the plunger is favorable to a better protection of needles 55 when they are introduced in pressing channel 5 by keeping them from possibly hitting the plunger.

These characteristics, among others, makes possible the production of relatively compact hay bales whose density is fairly constant.

Obviously, numerous modifications and variations of the present invention are possible in light of the above teachings. It is therefore to be understood that within the scope of the appended claims, the invention may be practiced otherwise than as specifically described herein.

I claim:

1. A plunger type hay baler comprising:
a frame internally defining a pressing channel;
an intake orifice in said pressing channel for introduction of hay;
a loading chute connected to said pressing channel at said intake orifice;
a pressure plunger reciprocatable in said pressure channel
loader means for periodically introducing hay from said loading chute to said pressing channel;
a transmission system for synchronously driving said pressing plunger and said loading means, and for driving said loading means along a closed path of movement, said transmission system including,
(a) a driving crankshaft,
(b) first and second driving pivots associated with said loader means, and
(c) means for converting rotational movement of said driving crankshaft to reciprocating rotary movement of said loader means
means for automatically adjusting a position of one of said first and second driving pivots as a function of a rotational position of said driving crankshaft, whereby a shape of said closed path changes as a function of said rotational position of said driving crankshaft.

2. The baler of claim 1 wherein said means for adjusting includes a movable crankpin movable in synchronization with said pressing plunger and carrying said first driving pivot.

3. The baler of claim 2 wherein said transmission further includes:
a tail fixed to said pressing plunger and pivotally connected to said driving crankshaft for reciprocating said plunger;
a rocker lever pivotable on a first shaft fixed to said frame;
a transmission connecting rod pivoted to said rocker lever and to said driving crankshaft;
a second shaft rotatably mounted on said rocker lever and fixed to said crankpin carrying said first driving pivot; and
means for transmitting movement of said rocker lever to said crankpin.

4. The baler of claim 3 wherein said loader means comprises:
slits in an upper wall of said loading chute;
arm means rotatably mounted on said frame;
a third shaft mounted on said arm means; and
a plurality of teeth mounted on said third shaft, each of said teeth having one end extending through one of said slits and into said loading chute and a second end connected for movement in response to movement of said first driving pivot.

5. The baler of claim 4 wherein said loading chute includes means for precompressing and rolling hay therein.

6. The baler of claim 5 wherein said slits define hinged strips therebetween, said hinged strips constituting said upper wall of said loading chute.

7. The baler of claim 5 wherein said means for precompressing and rolling include means for moving precompressed loads of hay into said pressing channel.

8. The baler of claim 1 including guiding means positioned between said plunger and opposite lateral walls of said pressing channel, said guide means permitting pivoting of said plunger about a horizontal axis passing through said lateral walls, wherein said transmission system further includes, a tail rigidly fixed to said plunger and pivoted to said driving crankshaft, whereby rotation of said driving crankshaft reciprocates said plunger in said pressing channel and oscillates said plunger about said horizontal axis.

* * * * *